No. 857,044. PATENTED JUNE 18, 1907.
P. FIREMAN.
PRODUCTION OF PRINTING INK PIGMENTS.
APPLICATION FILED OCT. 21, 1905.
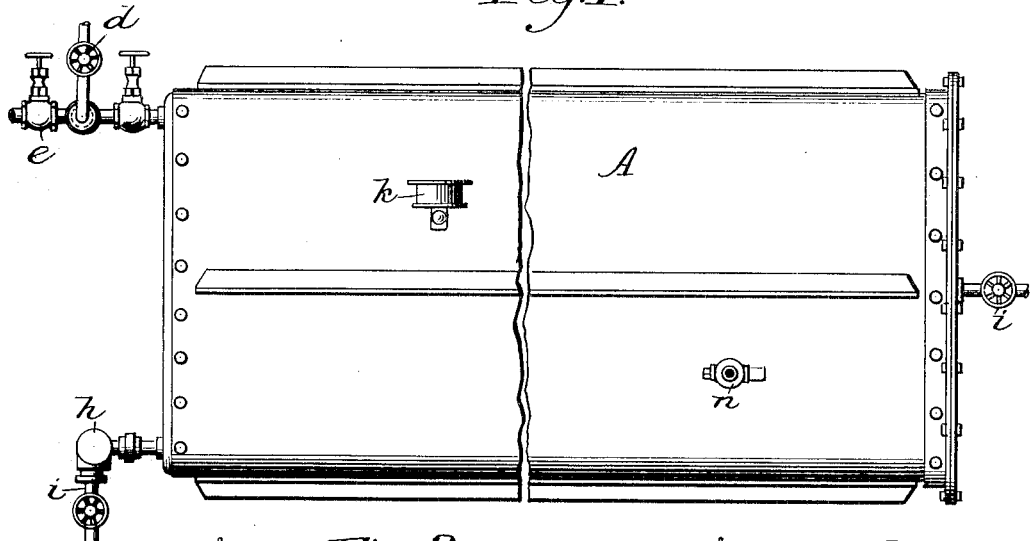
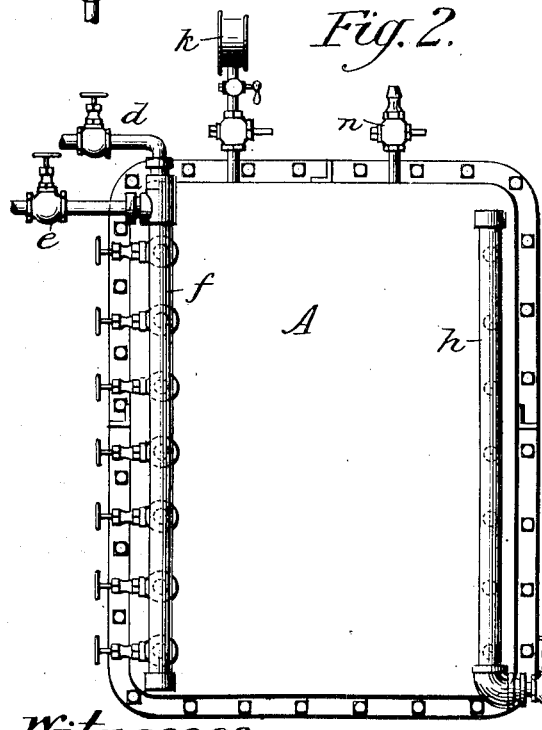
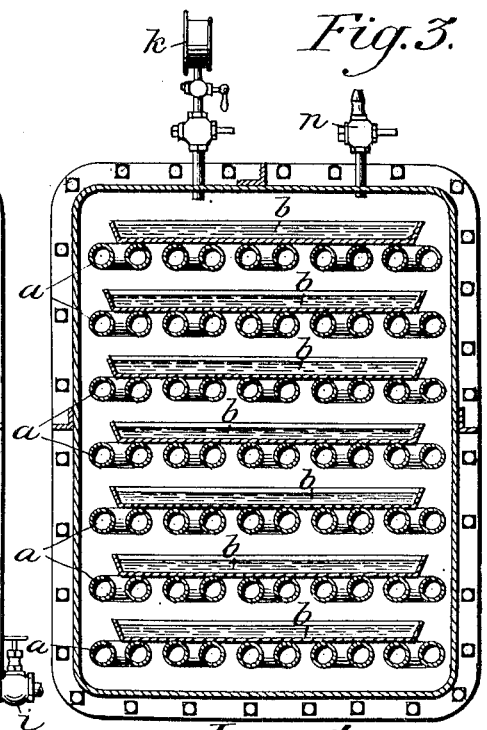

UNITED STATES PATENT OFFICE.

PETER FIREMAN, OF BRADDOCK HEIGHTS, VIRGINIA.

PRODUCTION OF PRINTING-INK PIGMENTS.

No. 857,044.    Specification of Letters Patent.    Patented June 18, 1907.

Application filed October 21, 1905. Serial No. 283,783.

*To all whom it may concern:*

Be it known that I, PETER FIREMAN, a citizen of the United States, residing at Braddock Heights, county of Alexandria, State of Virginia, have invented certain new and useful Improvements in Production of Printing-Ink Pigments; and I do hereby declare the following to be a full, clear, and exact description of the invention, such as will enable others skilled in the art to which it appertains to make and use the same.

In an application for Letters Patent of the United States filed by me under date of January 19, 1905, Serial No. 241,887, I have described and claimed the production of a dry precipitated black pigment consisting of magnetic ferro-ferric oxid in which the ratio of the ferrous to the ferric iron is 1:2 and somewhat lower.

Pigments of this composition are of relatively high stability and print a decided black, and, when rubbed upon white paper, produce no brown streaks.

In pursuing my investigations further, I have ascertained that there is another series of pigments having similar properties, and wherein the proportion of the ferrous to the ferric iron is considerably larger. In so far as I am aware, this is an entirely new discovery and, because of the well known avidity of ferrous oxid, in a free state to take up oxygen and pass over into the state of ferric oxid was not to be anticipated from anything before known to those versed in the art. The discovery has developed a series of ferro-ferric oxids, which are of great stability and which have the physical properties above referred to, even though ranging between the ratio of 1:0.5 up to the limit of 1:2. These pigments have a composition wherein the proportion of the ferrous oxid to the ferric iron is greater than is represented by the formula $FeO, Fe_2O_3$. The series constitutes a new industrial product, never produced heretofore and particularly adapted to the production of black printing inks.

In carrying out my invention, I preferably proceed along the general plan described in my application hereinbefore referred to. But, I vary from the procedure therein described in an important and essential particular. For instance, in the method described in my former application, in obtaining the final product therein described, I proceeded in accordance with one of two specific modifications, to wit; (*a*) I oxidized the precipitated ferrous oxid to such a degree only as would produce the final product due to the further oxidation unavoidable in the subsequent drying operation when conducted without the exclusion of air; or (*b*) I oxidized the precipitated ferrous oxid up to the point where the ferrous iron and ferric iron stood in the ratio called for by the equation $FeO, Fe_2O_3$ and then dried this oxidized precipitate with the exclusion of air. In contradistinction to each of these specific procedures, both of which result in a final product wherein the ratio of the ferrous to the ferric iron is 1:2 or less, I interrupt the oxidation of the ferrous oxid before the ratio of 1:2 is reached, and carry the oxidation no further in the subsequent drying operation, which latter I carry on with the exclusion of air. The resulting product is the dry precipitated black ferro-ferric oxid hereinafter claimed.

Referring now more specifically to the exact steps of my preferred procedure for obtaining the desired product, I would say that I first dissolve a ferrous salt in water, in a large tank provided for the purpose. From this ferrous salt solution I precipitate ferrous oxid by adding carbonate of soda, in large excess, or by adding caustic soda or some other soluble hydroxid. Simultaneously with the addition of the precipitating agent, I inject air into the solution and apply heat thereto, preferably by the introduction of live steam. The air is injected at the bottom of the tank and is caused to issue from the delivery pipe through a considerable number of small apertures. The temperature is brought up to and maintained at from 85° to 95° C. Under these conditions, the precipitate is uniformly oxidized and the oxidation is stopped at a point where the ratio of the ferrous iron to the ferric iron is greater than the ratio of the ferrous oxid to the ferric iron in the formula $FeO, Fe_2O_3$. This point is readily determined by analysis of a sample taken from the tank. The liquid, with the suspended precipitate is now brought to a boiling temperature, and is then filtered through a filter press, washed and dried.

The drying operation is carried on *in vacuo*, or otherwise, with the exclusion of air. Of the various modes of drying with the exclusion of air, I prefer the following. An oblong box, open only at one end, is provided with a number of tiers of steam pipes passing through its entire length and closely fitted in through the closed end. These pipes, besides conveying the steam, serve also as shelves upon which the precipitate is placed on trays. After the charge is introduced, the open end is closed airtight by a suitable cover, and superheated steam is caused to circulate through the coils of the pipes. The water vapor escapes through a number of check valves into the outer air, and the temperature being maintained in the drier at a degree considerably above 100° C., the pigment is expeditiously dried. When the escape of vapor from the check valves almost ceases, they are closed, and the receptacle is quickly cooled by directing a current of cold water through the steam pipes.

A suitable form of apparatus of the kind above described is illustrated in the accompanying drawing, wherein Figure 1 represents a plan view, Fig. 2 an end elevation, and Fig. 3 a transverse vertical section thereof.

In the drawing, A represents the oblong box, provided with the tiers $a$ of steam pipes, which serve as shelves to support the trays $b$. The inlet pipes $d$, $e$, for the admission of steam and water respectively communicate with the upright $f$ of the several tiers, and these tiers communicate severally with the upright $h$ which leads to the valved exit $i$. The apparatus may be provided with the customary pressure gage $k$ and with any desired number of check valves, one of which is indicated at $n$.

It is, of course, to be expected that, in the series of the black precipitated ferro-ferric oxids, produced in accordance with this practice, there will be greater or less difference in the degree in which they possess their common properties, and in the ease with which they can be handled in the various stages of the manufacture. For instance, they differ in the intensity of their color, those having a greater ratio of the ferrous to the ferric iron being of a lighter color, to wit gray black, while those of a lesser ratio gradually approach in color the black precipitated magnetic oxid of iron represented by the formula $FeO,Fe_2O_3$. I find, on the whole, that the precipitates or pigments in which the ratio of the ferrous to the ferric iron is say from 1:1.3 to 1:16. approach the precipitated magnetic oxid of iron proper most closely in color and adaptability for service for printing inks, while they are cheaper to produce, their oxidation requiring less time.

Instead of employing the particular method of oxidation and precipitation hereinbefore described, for obtaining, before drying, the preliminary product, I may, in some instances, employ a different method of oxidation and precipitation. Thus, starting from the same ferrous salt solution, I may effec the oxidation in any suitable way, as, for instance, by means of chlorin, nitric acid, or the like and then precipitate the mixed ferrous and ferric salt, by an alkaline carbonate or hydroxid. In this modified procedure I likewise carry on oxidation only to the extent of obtaining a final product wherein the ratio of the ferrous iron to the ferric iron shall be greater than 1:2, $i.$ $e.$ greater than the ratio of the ferrous iron to the ferric iron in the formula $FeO,Fe_2O_3$. As before, I dry this precipitate $in$ $vacuo$, or otherwise with the exclusion of air. The final dried product, however, in this instance, is not quite so satisfactory, from the standpoint of stability, as the dried product of my preferred mode of procedure, this difference being doubtless due to less intimate union between the ferrous and the ferric oxid.

What I claim is:—

1. The method of producing dry precipitated black ferro-ferric oxid, which consists in dissolving a ferrous salt, obtaining therefrom, by oxidation and precipitation, a ferro-ferric oxid wherein the ratio of the ferrous to the ferric iron is greater than that represented by the formula $FeO,Fe_2O_3$, and drying the same with the exclusion of air; substantially as described.

2. The method of producing dry precipitated black ferro-ferric oxid, which consists in dissolving a ferrous salt, precipitating the salt by a substance having an alkaline reaction, oxidizing the precipitate by a current of air to such a degree as to produce a ferro-ferric oxid wherein the ratio of the ferrous to the ferric iron is greater than that represented by the formula $FeO,Fe_2O_3$, and drying the same with the exclusion of air; substantially as described.

3. Dry precipitated black ferro-ferric oxid, wherein the ratio of the ferrous to the ferric iron is greater than is represented by the formula $FeO,Fe_2O_3$; substantially as described.

In testimony whereof I affix my signature, in presence of two witnesses.

PETER FIREMAN.

Witnesses:
   CHAS. J. O'NEILL,
   JOHN C. PERRINE.